United States Patent Office 3,547,851
Patented Dec. 15, 1970

3,547,851
NON-FLOWABLE ANAEROBIC ADHESIVE
Elliott Frauenglass, Newington, Conn., assignor to Loctite Corporation, Newington, Conn., a corporation of Connecticut
No Drawing. Filed Jan. 2, 1968, Ser. No. 694,867
Int. Cl. C08f $3/64$
U.S. Cl. 260—23.5                             18 Claims

ABSTRACT OF THE DISCLOSURE

Anaerobic adhesive compositions composed of a polymerizable acrylate ester monomer and a peroxy polymerization initiator are rendered non-flowable at room temperature by uniformly distributing throughout the adhesive a network of a normally solid organic substance insoluble in the adhesive. The organic substance is basically linear in nature, typified by insoluble thermoplastic resins, normally solid paraffin hydrocarbons, and normally solid fatty substances having about 10 or more carbon atoms.

BACKGROUND OF THE INVENTION

The assembly and sealing of metal and other parts with chemical adhesives and sealants (hereinafter frequently referred to jointly as "adhesives") are becoming important production and maintenance tools in modern industry. While many adhesives and sealants are available, among the most important of these chemical agents are anaerobically-curing acrylate based sealants and adhesives. These materials remain stable until they are removed from the presence of air (such as when placed between adjacent metal surfaces) at which time they polymerize to form durable adhesive bonds and air tight seals.

These stable, single-component systems have been found useful in solving a wide variety of industrial problems. However, because the most desirable acrylate monomers are liquids at room temperature, and because tradition has dictated that adhesive materials be flowable at room temperature, only liquid or semi-liquid adhesives have been available. Furthermore, it has been felt that liquids must be used to affect wetting of the surfaces which are to be bonded or sealed. The need to use liquids generally has precluded preapplication of adhesives to metal and other parts, thus necessitating the application of adhesives at the time of assembly.

Some success has been achieved recently by encapsulating adhesives and preapplying these capsules to parts destined for assembly. However, this is a difficult, expensive, and time-consuming process requiring encapsulation, applying capsules to the parts, and the taking of special precautions to ensure application and retention of adequate numbers of capsules on the metal parts. Further, when microcapsules are placed on the threads of fasteners, they frequently offer substantial resistance to the winding of the mating part (such as a nut) onto the fastener. In addition, largely due to the presence of the shell material in the bonds, fully satisfactory results have not been achieved.

Accordingly, there is a need for a stable adhesive material which can be prepared and applied conveniently to metal and other parts prior to the time of assembly which will remain on the parts during normal storage and shipping. Attempts to make such a product have been made, such as by producing extremely viscous anaerobic systems by adding various thickening agents to conventional anaerobic adhesives. However, regardless of the viscosity level obtained, the liquid or semi-liquid anaerobic adhesive does not perform satisfactorily. Since the material is still flowable at normally encountered temperatures, some amount of "flow" inevitably is encountered during the period between application and use, particularly under the shock and temperature changes encountered in normal storage and shipping operations. As a result, the anaerobic adhesive flows off of at least a portion of the application area, and flows to a location where the presence of adhesive is not necessarily desired. Equally as important, at high thickener levels, the bonding and sealing efficiency of the anaerobic is diluted or destroyed due to the large amount of thickener present. An anaerobic composition, non-flowable at room temperature, would avoid the above problems.

THE INVENTION

This invention relates to a normally flowable polymerizable monomer, rendered substantially non-flowable by incorporating therein a normally solid organic substance which is substantially insoluble in the monomer. This invention further relates to an anaerobic adhesive composition, non-flowable at or near ambient temperature, e.g., 70° F., which comprises; (a) a normally flowable polymerizable acrylate ester monomer; (b) a peroxy polymerization initiator; and (c) an organic compound having a melting point greater than about 80° F. and being substantially insoluble in the mixture of (a) plus (b); the solid organic compound being uniformly distributed in the mixture of (a) plus (b) and comprising from about 5% to about 80% by weight of the adhesive composition, and being present in sufficient amount to render the adhesive composition substantially non-flowable at room temperature.

The invention also contemplates the method of converting a mixture of a normally-flowable polymerizable acrylate ester and peroxy polymerization initiator to non-flowable form by uniformly distributing in the mixture a normally solid organic compound which is substantially insoluble in the mixture, the normally solid organic compound comprising from about 5% to about 80% by weight of the total composition, and being present in sufficient amount to render the total composition non-flowable at room temperature.

While the exact reason for the formation of the product of this invention is not known, it is believed that the organic compound forms an interconnected network of solid particles which is capable of entrapping an exceptionally large amount of the liquid which is present. The final product exhibits many of the characteristics of a solid, i.e., a fairly precise melting point or a very narrow melting range, and the ability to support its own weight at temperatures below its melting point or melting range. It has been found that anaerobic adhesive and sealant products made accordingly to this invention can be preapplied to most parts destined for assembly without fear of flow during storage at ambient conditions. At the time of use effective bonding and/or sealing is achieved after a short period of time as is more fully discussed below.

Another aspect of this invention involves a threaded fastener having the non-flowable adhesive described above applied to the threaded portion thereof. Such threaded fasteners are extremely convenient objects of commerce since these fasteners have self-contained sealing means and, in use, will bond to the mating surface, producing increased holding power and resistance to loosening.

The invention disclosed herein further encompasses a process for making an anaerobic sealant non-flowable at room temperatures, by either: (a) mixing the above described components at a temperature at which all the materials are in the liquid state, such mixing being sufficient to provide a uniform distribution of the normally solid organic compound throughout the mixture of monomer and initiator, and then cooling the mixture to allow the solid organic compound to crystallize and form the non-flowable adhesive product; or (b) dissolving the components of the final composition in a mutual solvent, i.e., one of such type and amount as will dissolve all of the products of the invention disclosed herein, and then removing the mutual solvent by evaporation to allow the non-flowable adhesive product to form.

DISCUSSION OF THE INVENTION AND ITS PREFERRED EMBODIMENTS

The monomers contemplated for use in the invention disclosed herein are polymerizable acrylate esters. As used herein, "acrylate esters" include the alpha-substituted acrylate esters, such as the methacrylate, ethacrylate, and chloroacrylate esters. Monomers of this type, when mixed with a peroxy initiator as described below, form desirable adhesives of the anaerobic type.

Anaerobic adhesives are those which remain stable in the presence of air or oxygen, but which when removed from the presence of air or oxygen will polymerize to form hard, durable resins. This type of adhesive is particularly adaptable to the bonding of metals and other non-porous or non-air permeable materials since they effectively exclude air and oxygen from contact with the adhesive, and therefore the adhesive polymerizes and bonds the surfaces together. Of particular utility as adhesive monomers are polymerizable di- and other polyacrylate esters since, because of their ability to form cross-linked polymers, they have more highly desirable adhesive properties. However, monoacrylate esters can be used, particularly if the non-acrylate portion of the ester contains a hydroxyl or amino group, or other reactive substituent which serves as a site for potential cross-linking. Examples of monomers of this type are hydroxyethyl methacrylate, cyanoethyl acrylate, t-butylaminoethyl methacrylate and glycidyl methacrylate. Anaerobic properties are imparted to the acrylate ester monomers by combining with them a peroxy polymerization initiator as discussed more fully below.

One of the most preferable groups of polyacrylate esters which can be used in the adhesives disclosed herein are polyacrylate esters which have the following general formula:

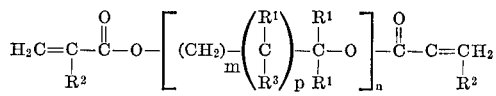

wherein $R^1$ represents a radical selected from the group consisting of hydrogen, lower alkyl of from 1 to about 4 carbon atoms, hydroxy alkyl of from 1 to about 4 carbon atoms, and

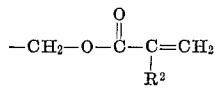

$R^2$ is a radical selected from the group consisting of hydrogen, halogen, and lower alkyl of from 1 to about 4 carbon atoms; $R^3$ is a radical selected from the group consisting of hdrogen, hydroxyl, and

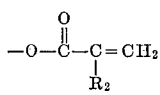

$m$ is an integer equal to at least 1, e.g., from 1 to about 15 or higher, and preferably from 1 to about 8 inclusive; $n$, is an integer equal to at least 1, e.g., 1 to about 20 or more; and $p$ is one of the following: 0, 1.

The polymerizable polyacrylate esters utilized in accordance with the invention and corresponding to the above general formula are exemplified by but not restricted to the following materials: di-, tri- and tetraethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which inhibitors or stabilizers, such as polyhydric phenols, quinones, etc. are included. As used herein the term "polymerizable polyacrylate eter monomer" includes not only the foregoing monomers in the pure and impure state, but also these other compositions which contain those monomers in amounts sufficient to impart to the compositions the polymerization characteristics of polyacrylate esters. It is also within the scope of the present invention to obtain modified characteristics for the cured composition by the utilization of one or more monomers within the above formula with other unsaturated monomers, such as unsaturated hydrocarbons or unsaturated esters.

The preferred peroxy initiators for use in combination with the polymerizable acrylate or polyacrylate esters described above are the hydroperoxy polymerization initiators, and most preferably the organic hydroperoxides which have the formula $R^6OOH$, wherein $R^6$ generally is a hydrocarbon radical containing up to about 18 carbon atoms, preferably an alkyl, aryl or aralkyl radical containing from 1 to about 12 carbon atoms. Typical examples of such hydroperoxides are cumene hydroperoxide methylethylketonehydroperoxide, and hydroperoxides formed by the oxygenation of various hydrocarbons, such as methylbutene, cetane and cyclohexene. However, other peroxy initiators, such as hydrogen peroxide or materials such as certain organic peroxides or peresters which hydrolyze or decompose to form hydroperoxides frequently can be used.

The peroxy initiators which are used commonly comprise less than about 20% by weight of the combination of monomer and initiator since above that level they begin to affect adversely the strength of the adhesive bonds which are formed. Preferably the peroxy initiator comprises from about 0.1 to about 10% by weight of the combination.

Other materials can be added to the mixture of polymerizable acrylate ester monomer and peroxy initiator, such as quinone or polyhydric phenol stabilizers, tertiary amine or imide accelerators, and other functional materials, such as thickeners, coloring agents, etc. These additives are used to obtain commercially desired characteristics, i.e., suitable viscosity and shelf stability for extended periods (e.g., a minimum of one month). The presence of these additives is particularly important when peroxy initiators other than organic hydroperoxides are used. For a complete discussion of the anaerobic systems and anaerobically curing compositions, reference is made to the following U.S. Pats.: 2,895,950 to Vernon K. Krieble, issued July 21, 1959; 3,041,322 to Vernon K. Krieble, issued June 26, 1962; 3,043,820 to Robert H. Krieble, issued July 10, 1962; 3,046,262 to Vernon K. Krieble, issued July 24, 1962; 3,203,941 to Vernon K. Krieble, issued Aug. 31, 1965; 3,218,305 to Vernon K. Krieble, issued Nov. 16, 1965; and 3,300,547 to J. W. Gorman et al., issued Jan. 24, 1967.

The solid organic materials which has been found useful in the invention disclosed herein repossess two common characteristics. First, they are substantially insoluble in the mixture of acrylate monomer and polymerization initiator at room temperature. Absolute or near absolute insolubility is not essential, although as absolute insolubility is approached, more desirable non-flowable adhesive systems tend to be formed. What is required is that the amount of normally solid organic material which is insoluble be of sufficient amount to provide non-flowable characteristics to the adhesive composition. Further, the total amount of normally solid organic material (insoluble plus soluble, if any) must be within the use ranges disclosed above and discussed more fully below.

Secondly, the solid organic materials, when used in the non-flowable adhesives of this invention, appear to exhibit a substantially linear crystal structure. While it is not known with certainty, it is felt that these molecules, upon uniform distribution throughout the liquid anaerobic adhesive, form a network of elongated crystals which create a crystal network which entraps substantial quantities of the liquid, producing a uniform, heterogenous, non-flowable mass.

The solid organic material must be used in sufficient quantity to lend non-flowable character to the adhesive composition at ambient temperatures. No material has been found which was useful at a use level below about 5% by weight of the total composition. To provide desirable "firmness," it has been found desirable to use at least about 10% by weight. At the other extreme, the level of use of the solid organic material is determined by the intended use for the final product. If sealing is to be the primary function (low adhesion is adequate), the solid organic material can comprise about 80% by weight of the total composition, or even more. Since adhesion generally is the desired property, however, the preferred maximum use level for the solid organic material is about 40% by weight of the composition since adhesion is markedly decreased above that level.

In choosing the normally solid organic material, and to some extent its level of use, the desired melting point of the non-flowable adhesive is critical. The higher melting point solid organics produce higher melting point in the non-flowable adhesive, although the two melting points seldom, if ever, are the same. For a given solid organic, a somewhat higher melting point can be imparted to the non-flowable adhesive by using a greater proportion of solid organic.

To be useful for the purposes of this invention, the melting point of the non-flowable adhesive should be at least 70° F., and preferably is at least 80° F. This is essential to permit the non-flowable adhesive to remain non-flowable during normal conditions of use. The maximum desired melting point is a matter of convenience; however, with many solid organics having exceptionally high melting points, it is frequently difficult to prepare non-flowable adhesives because of difficulties encountered in dispersing the solid uniformly throughout the liquid adhesive. The most highly preferred melting points for the non-flowable adhesives disclosed herein are from about 100° F. to about 150° F., since these temperatures will permit use under ambient conditions in most industries.

Any normally solid organic substances capable of functioning as described above can be used in the compositions of the invention disclosed herein; however, certain classes of materials have been found particularly useful. These classes are as follows:

(a) Thermoplastic polymers (i.e., polymeric substances with little or no cross-linking between polymers) which are of a type and of sufficient molecular weight (preferably at least about 4,000) to be substantially insoluble in the mixture of monomer and initiator, and a solid at ambient temperatures (e.g., about 75° F., and preferably 85° F.) and above. Typical examples of polymers which meet the above criteria are polyglycols, such as polyethylene glycols and polypropylene glycols, preferably with an average molecular weight of at least about 4,000; polyamines, such as polyethyleneimine, polypropyleneimine, and polyphenyleneimine; polyesters, such as polyethyleneterephthalate and polyethylene adipate; and phenolics, such as chlorinated polyphenyls.

(b) Saturated hydrocarbons which meet the melting point and solubility requirements defined in (a), above. The hydrocarbons preferably are straight chain hydrocarbons since these are more efficient in making the non-flowable adhesives disclosed herein, and also because they are more readily available. However, the presence of a branched or cyclic configuration within a portion of the molecule will not make the hydrocarbon inoperative for purposes of this invention. The preferred minimum molecular weight for the saturated hydrocarbons is about 250. In high molecular weight hydrocarbons, e.g., about 350 and above, low levels of unsaturation can exist without destroying its usefulness in the products of this invention provided the above melting point and solubility requirements are met.

(c) Esters of polyols which meet the melting point and solubility requirements defined in (a), above. Particularly desirable esters of this type are the $C_8$ and longer fatty acid esters, and preferably about $C_{10}$ to about $C_{24}$ fatty acid esters, of polyols, such as glycerol, glycols and polyglycols.

(d) Compounds of the formula R—X, where R is a hydrocarbon group containing at least about 10 carbon atoms and preferably is a straight chain hydrocarbon group, and X is one of the following: OH, $CO_2H$, $CO_2R$, OM, $CO_2M$, CHO, CN, $SO_3$, $HSO_4$, Cl, Br, and $CONH_2$, where M is an ion of an alkali or alkaline earth metal.

Within any of the above classes, the solubility of the solid organic material in the mixture of monomer and initiator will vary somewhat with the nature of the monomer (for example, the polyethylene glycol dimethacrylates are more polar than the polymethylenediol dimethacrylates) and the molecular weight of the solid organic material (as shown by the fact that a suitable non-flowable adhesives can be prepared with 5% by weight polyethylene glycol of 20,000 molecular weight, whereas about 50% by weight of polyethylene glycol of 1,500 molecular weight must be used to obtain comparable results). However, the materials in the above classes are suitable for use in the invention disclosed herein. Of all the materials tested, the most desirable of the solid organic substances has been found to be the polyalkylene glycols, particularly the polyethylene glycols and polypropylene glycols, having a minimum molecular weight of about 1,500. Most preferably, the minimum molecular weight is at least about 4,000.

Preparation of the product of this invention may be by any method capable of achieving the interdispersion of the normally solid organic material throughout the combination of liquid polymerizable acrylate ester and polymerization initiator. However, two methods of preparation have been found particularly useful because of their relative ease, and because of the uniform, satisfactory results which are obtained.

The first method involves melting of the particular components and uniformly mixing them in a liquid state. While in some instances vigorous mixing may be necessary to obtain a reasonably uniform intermixing of the components, the solid material, when melted, frequently will dissolve or disperse readily in the remainder of the composition. The intimately mixed liquid composition merely needs to be cooled to produce the final product. It is believed that rapid cooling of the composition tends to produce smaller crystals and therefore, a smaller amount of solid organic material need be used to produce an acceptable product, and for a given amount of solid organic, a more firm and uniform product results. If the melted normally solid organic material does not readily disperse in the remainder of the composition, vigorous agitation followed by rapid cooling frequently will be sufficient to provide a sufficiently uniform distribution of the components and allow the preparation of the products of this invention. This method is particularly adaptable to use with solid organic materials such as the polyalkyleneglycols which are readily dispersed or dissolved in the mixture of acrylate ester and initiator. It should not be used when the melting point of the solid organic is above about 250° F. since above this temperature the acrylate esters, in the presence of the polymerization initiator, frequently will begin to polymerize The second method of preparation involves the use of a volatile, mutual solvent, i.e., one which is capable of dissolving or dispersing all of the components of the final composition and thus providing a uniform distribution of the normally solid organic in the mixture of acrylate ester and polymerization initiator. The solvent then is evaporated, preferably aided by the application of moderate amounts of heat, to solidify the organic material and produce the non-flowable adhesive compositions of this invention. Typical solvents which are suitable for this purpose are acetone, ethyl acetate, and chlorinated hydrocarbons such as dichloromethane, trichloroethane and chloroform.

EXAMPLES

The following examples are given to demonstate the preparation of non-flowable adhesives within the scope of the invention described herein. They are not intended to be limitations on the scope of the invention. Unless stated to the contrary, all ratios and percentages in these examples are on a weight basis.

EXAMPLE 1

A polymerizable liquid adhesive system was prepared by mixing the ingredients tabulated below in the following approximate proportion:

TABLE I

Ingredients:
Polyethyleneglycol dimethacrylate (avg. molecular weight=330) weight (percent) ___ 96.3
Cumene hydroperoxide _____do__ 3.0
Latent accelerator (dimethyl-p-toluidene and banzoylsulfimide in weight ratio of 4.3) _____ weight (percent)__ 0.7
Stabilizer (quinone)__100 p.p.m. by weight__ 100.0

The liquid adhesive system then was used to prepare three non-flowable adhesive compositions. Each compositions was prepared by warming a portion of the adhesive to about 120° F. and mixing with it a predetermined amount of melted polyethylglycol (avg. molecular weight=20,000) (hereafter called PEG 20,000) which had been heated to about 180° F. The final mixtures then were allowed to cool in a 250 ml. beaker to room temperature to form non-flowable adhesive compositions. The non-flowable adhesive compositions and their melting points were as follows:

TABLE II

| | Wt. (percent) liquid adhesive | Wt. (percent) PEG 20,000 | Composition melting point,° F. (approx.) |
| --- | --- | --- | --- |
| Composition I | 95 | 5 | 72 |
| Composition II | 70 | 30 | 140 |
| Composition III | 50 | 50 | 158 |

A fourth non-flowable adhesive composition was prepared, using the method described above, from a liquid adhesive comprising approximately 97 wt. percent polyethyleneglycol dimethacrylate, 3 wt. percent cumene hydroperoxide, 100 parts per million by weight of quinone, and no latent accelerator.

TABLE III

Composition IV:
Wt. (percent) liquid adhesive _____ 80
Wt. (percent) PEG 20,000 _____ 20
Composition, melting point (approx.) __° F.__ 113

Two additional non-flowable adhesive compositions were prepared using the liquid adhesive system described in Table I about, and polyethyleneglycol with an average molecular weight of 1,500 (hereafter PEG 1,500). The non-flowable adhesive compositions were prepared by the method described above, except that the PEG 1,500 was heated only to about 150° F. to melt it.

TABLE IV

| | Wt. (percent) liquid adhesive | Wt. (percent) PEG 1,500 | Composition melting point,° F. (approx.) |
| --- | --- | --- | --- |
| Composition V | 40 | 60 | 79 |
| Composition VI | 25 | 75 | 90 |

The anaerobic adhesive properties of Compositions I–VI, inclusive, were evaluated by applying samples of each to standard ⅜″—24 standard bolts. Application was made by dipping the bolt into the melted composition, allowing the excess adhesive to run off the bolt, and then setting the bolt aside, permitting the non-flowable adhesive to reform upon cooling (generally within about two minutes). The adhesive coating remained on the bolt as a non-flowable, uniform, substantially non-tacky coating.

The bolts then were fitted with standard mating ⅜″ nuts; in each case, the coating offered no noticeable resistance to the winding of the nut onto the bolt, e.g., a torque of less than one inch-pound was required. After 24 hours, it was noted that the adhesive coating material above and below the nut remained in the uncured state, but the coating material under the nut had cured to bond the nut to the bolt. This clearly demonstrates the anaerobic character of the non-flowable adhesive. The torque required to remove the nut from the bolt was determined, using a conventional torque wrench. Both the "breakaway" and "prevailing" torques were measured. "Breakaway torque" is the amount of torque required to produce the first relative movement between the nut and bolt. "Prevailing torque" is the torque required to produce continuing relative movement between the nut and bolt, specifically the average torque required to produce one full revolution of the nut.

The results were as follows, each being the average of three samples:

TABLE V

| | Breakaway torque | Prevailing torque |
| --- | --- | --- |
| Composition: | | |
| I, ft. lbs | 7 | 7 |
| II, ft. lbs | 7 | 4 |
| III, ft. lbs | 1 | 0.5 |
| IV, ft. lbs | 4 | 3 |
| V, in. lbs | 18 | 10 |
| VI, in. lbs | 15 | 6 |

EXAMPLE 2

Air was bubbled through 250 cc. of polyethyleneglycol dimethacrylate (avg. molecular weight=330) until the active oxygen content (oxygen which is chemically bound to the dimethacrylate) reached 110 parts per million by weight. (Active oxygen content was determined by using weighted samples of the oxygenated dimethyacrylate monomer to oxydize solium iodide to iodine, and then titrating the iodine so formed with a standardized sodium thiosulfate solution). The oxygenated dimethacrylate then was used to prepare a series of non-flowable adhesive compositions by mixing with the dimethacrylate a predetermined amount of a solid organic material. The compositions are given below in Table VI. In each case, the composition was prepared by heating and oxygenated dimethacrylate to about 120° F., heating the particular normally solid organic material to about about 10° F. about its melting point, mixing the two liquid components with mild agitation, and then allowing the mixture to cool and form the non-flowable adhesive.

TABLE VI

| Composition: | Solid organic added | Wt. (percent) oxygenated monomer | Wt. (percent) solid organic | Melting point of composition, °F. (approx.) |
|---|---|---|---|---|
| VII | Eicosanol | 20 | 80 | 100 |
| VIII | Ethylene-bis-stearamide | 20 | 80 | 266 |
| IX | Ross Wax #160 | 20 | 80 | 122 |
| X | Glycerol monostearate | 20 | 80 | 95 |

Coatings of the non-flowable adhesives then were applied to standard 3/8"—24 bolts, and the bolts assembled with a mating nut, as described in Example 1. In each case the nut was assembled onto the bolt without noticeable interference from the coating. The nut and bolt assemblies were set aside. After three days, it was found that the nuts and bolts could not be disassembled without the use of a wrench. However, the coating material on the bolt above and below the nut was uncured, clearly demonstrating the anaerobic curing characteristics of the non-flowable adhesive compositions.

EXAMPLE 3

Non-flowable adhesive compositions XI and XII were prepared using the method described above in Example 2, and using cetyl alcohol as the solid organic material. The approximate final compositions were as follows:

TABLE VII

| Ingredient | Composition XI, wt. (percent) | Composition XII, wt. (percent) |
|---|---|---|
| Hexamethylenediol dimethacrylate | 75.0 | 74.3 |
| Cumene hydroperoxide | 3.0 | 3.0 |
| Latent accelerator (4:3 weight ratio of dimethyl-p-toluidine and benzoylsulfimide) | 0 | 0.7 |
| Quinone | ¹ 200 | ¹ 200 |
| Cetyl alcohol | 22.0 | 22.0 |
| Approximate melting point, °F | 74 | 74 |

¹ Parts per million.

Coatings of Compositions XI and XII were applied to 3/8"—24 bolts as described in Example 1, and the bolts were assembled with a mating nut. In each case, the nut was assembled onto the bolt without noticeable interference from the coating. After 24 hours, using the test described in Example 1, the torques necessary to remove the nuts were measured. Since, after 24 hours, it was still possible to remove the nuts from the bolts coated with Composition XI by hand, a second set of samples was prepared, and measurements were made after 72 hours. The results were as follows, each number being an average of three samples:

TABLE VIII

| | Breakaway torque, in. lbs. | Prevailing torque, in. lbs. |
|---|---|---|
| Composition: | | |
| XI (72 hours) | 41 | 23 |
| XII (24 hours) | 10 | 5 |

As in the previous examples, the coating material on the bolt above and below the nut remained in the uncured state, demonstrating the anaerobic curing properties of the non-flowable adhesive.

EXAMPLE 4

Using the method described in Example 2, non-flowable adhesive Composition XIII was prepared, using PEG 20,000 as the solid organic material. The approximate final composition was as follows:

TABLE IX

Ingredient:
Polyethyleneglycol dimethacrylate (avg. molecular wt.=330) _____weight percent__ 79.3
Hydrogen peroxide _____do____ 3.0
Latent initiator (see Examples 1 and 3)
          weight percent__ 0.7
PEG 20,000 _____do____ 17.0
Approximate melting point _____° F.__ 86

A coating of Composition XIII was applied to bolts as described in Example 1, and the bolts were assembled with mating nuts. After three days, the nuts could not be removed without the use of a wrench. The coating of non-flowable adhesive above and below the nut remained in the uncured state.

EXAMPLE 5

Using the method described in Example 2, non-flowable adhesive Composition XIV was prepared, using PEG 20,000 as the solid organic material. The approximate final composition was as follows:

TABLE X

Ingredient:
Triethyleneglycol dimethacrylate
          weight percent__ 84.3
t-Butylperbenzoate _____do____ 3.0
Latent accelerator (see Examples 1 and 3)
          weight percent__ 0.7
PEG 20,000 _____do____ 12.0
Approximate melting point _____° F.__ 77

A coating of Composition XIV was applied to 3/8"—24 bolts as described in Example 1, and the bolts were assembled with mating nuts. After 24 hours, the nuts were removed from the bolts in the test described in Example 1, using triplicate samples. The breakaway torque was 7 ft. lbs. and the prevailing torque was 6 ft. lbs. The coating of non-flowable adhesive above and below the nut remained in the uncured state.

EXAMPLE 6

Using the method described in Example 2, non-flowable adhesive Composition XV was prepared, using PEG 20,-

000 as the solid organic material. The approximate final composition was as follows:

TABLE XI

Ingredient:
- Hydroxyethylmethacrylate __weight percent__ 59.3
- Cumene hydroperoxide _____do____ 3.0
- Latent accelerator (see Examples 1 and 3) weight percent__ 0.7
- PEG 20,000 _____do____ 37.0
- Approximate melting point _____° F.__ 81

A coating of Composition XV was applied to ⅜"—24 bolts as described in Example 1, and the bolts were assembled with mating nuts. After 24 hours, the nuts were removed from the bolts in the test described in Example 1, using triplicate samples. The breakaway torque was 17 in. lbs. and the prevailing torque was 18 in. lbs. The coating of the non-flowable adhesive above and below the nut remained in the uncured state.

EXAMPLE 7

Using the method described in Example 2, non-flowable adhesive composition XVI was prepared, using a commercial grade paraffin hydrocarbon (melting point=120° F.) as the solid organic material. The approximate final composition was as follows:

TABLE XII

Ingredient:
- Hexamethylene dimethacrylate weight percent__ 85.0
- p-Menthane hydroperoxide _____do____ 3.0
- Paraffin hydrocarbon _____do____ 12.0
- Quinone _____p.p.m. by weight__ 200
- Approximate melting point _____° F.__ 81

In preparing Composition XVI, the paraffin hydrocarbon was not readily soluble in liquid adhesive system, and it was necessary to agitate the composition while in the liquid state to keep the paraffin hydrocarbon uniformly distributed in the composition.

A coating of Composition XVI was applied to ⅜"—24 bolts as described in Example 1, and the bolts were assembled with mating nuts. After 24 hours, the nuts were removed from the bolts in the test described in Example 1, using triplicate samples. The breakaway and prevailing torques both were 1 ft. lb. The coating of non-flowable adhesive above and below the nut remained in the uncured state.

Each of the Compositions I through XV described above, is a shelf-stable composition in the presence of air; that is, when stored in sheets or in air permeable containers (e.g., polyethylene) in reasonably small thickness (e.g., one-inch maximum), the adhesive will not polymerize provided it is not subjected to excessively high temperatures or to polymerization accelerators. Further, they retain their solid characteristic at temperatures below their melting points. When used as coatings for parts destined for assembly, such as threaded fasteners and pipe and tube couplings, the coatings will not be removed by shock or by temperature changes below their melting points. As shown above, they possess anaerobic curing characteristics, a property which is retained for extended periods, such as six months or more.

I claim:

1. An anaerobic adhesive composition which comprises: (a) a flowable mixture comprising a polymerizable acrylate ester monomer and a peroxy polymerization initiator therefor; and (b) an organic compound having a melting point greater than about 80° F. and being substantially insoluble in mixture (a); the solid organic compound being uniformly distributed in mixture (a) and being present in sufficient amount to render the adhesive composition substantially non-flowable at 70° F.

2. The adhesive composition of claim 1 wherein the acrylate ester is a polyacrylate ester.

3. The adhesive composition of claim 2 wherein the polyacrylate ester has the formula:

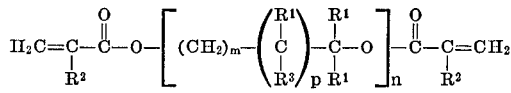

wherein $R^1$ represents a radical selected from the group consisting of hydrogen, lower alkyl of from 1 to about 4 carbon atoms, hydroxy alkyl of from 1 to about 4 carbon atoms, and

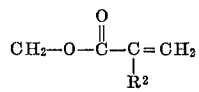

$R^2$ is a radical selected from the group consisting of hydrogen, halogen, and lower alkyl of from 1 to about 4 carbon atoms; $R^3$ is a radical selected from the group consisting of hydrogen, hydroxyl, and

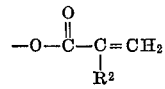

$m$ is an integer equal to at least 1; $n$ is an integer equal to at least 1; and $p$ is one of the following: 0, 1.

4. The adhesive composition of claim 1 wherein the peroxy polymerization initiator is an organic hydroperoxide.

5. The adhesive composition of claim 1 wherein the organic compound is a saturated hydrocarbon.

6. The adhesive composition of claim 1 wherein the organic compound is a fatty acid ester of a polyol.

7. The adhesive composition of claim 1 wherein the organic compound is a compound of the formula R—X, where R is a hydrocarbon group containing at least about 10 carbon atoms, and X is one of the following: OH, $CO_2H$, $CO_2R$, OM, $CO_2M$, CHO, CN, $SO_3$, $HSO_4$, Cl, Br, and $CONH_2$ where M is selected from the group consisting of alkali metals and alkaline earth metals.

8. An anaerobic composition which comprises: (a) a flowable mixture comprising a polymerizable acrylate ester monomer and a peroxy polymerization initiator therefor; and (b) an organic compound having a melting point greater than about 80° F. and being substantially insoluble in mixture (a); the solid organic compound being uniformly distributed in mixture (a), comprising from about 5% to about 80% by weight of the adhesive composition, and being present in sufficient amount to render the adhesive composition substantially non-flowable at 70° F.

9. The composition of claim 8 wherein the acrylate ester is a polyacrylate ester, and the polymerization initiator is a hydroperoxide.

10. The adhesive composition of claim 8 wherein the composition additionally contains a polymerization accelerator.

11. The adhesive composition of claim 8 wherein the organic compound comprises from about 10% to about 40% by weight of the adhesive composition.

12. The adhesive composition of claim 8 wherein the organic compound is a thermoplastic polymer with a molecular weight of at least about 4,000.

13. The adhesive composition of claim 12 wherein the polymer is a polyglycol.

14. The adhesive composition of claim 8 wherein the melting point of the adhesive composition is at least about 100° F.

15. The method of converting a normally-flowable mixture of a polymerizable acrylate ester and peroxy polymerization initiator therefor to non-flowable form by uniformly distributing in the mixture a solid organic compound which is substantially insoluble in the mixture, the solid organic compound comprising from about 5% to about 80% by weight of the total composition, and being present in sufficient amount to render the total composition non-flowable at 70° F.

16. The method of making an adhesive composition which is non-flowable at 70° F. which comprises mixing (a) a flowable mixture comprising a polymerizable acrylate ester monomer and a peroxy polymerization initiator therefor; with (b) an organic compound having a melting point greater than about 80° F., the organic compound being substantially insoluble in mixture (a) at 70° F.; said mixing being at a temperature at which (c) is in the liquid state, and being sufficient to provide a uniform distribution of the organic compound in mixture (a); and then cooling the total mixture of (a) and (b) to allow the organic compound to solidify and form the non-flowable adhesive.

17. The method of making an adhesive composition which is non-flowable at 70° F. which comprises mixing: (a) flowable polymerizable acrylate ester monomer; (b) a peroxy polymerization initiator; and (c) an organic compound having a melting point greater than about 80° F., the organic compound being substantially insoluble in the mixture of (a) plus (b) at 70° F.; said mixing being in a solvent in which all of (a), (b) and (c) are soluble; and then removing the solvent to allow the non-flowable adhesive to form.

18. A threaded fastener having the non-flowable adhesive composition of claim 8 applied to the threaded portion thereof.

References Cited
UNITED STATES PATENTS
3,300,547  1/1967  Gorman et al. _____ 260—885

OTHER REFERENCES
"Physical Properties, Synthetic Organic Chemicals," 1961 edition, Union Carbide (1961), p. 22.

DONALD E. CZAJA, Primary Examiner

D. J. BARRACK, Assistant Examiner

U.S. Cl. X.R.
151—14.5; 260—23, 28.5, 30.8, 31.2, 32.4, 32.6, 33.2, 33.4, 33.6, 33.8, 45.7, 45.95, 89.5, 885